United States Patent
Tertinek et al.

(10) Patent No.: US 11,381,329 B2
(45) Date of Patent: Jul. 5, 2022

(54) DETECTING A MOVING OBJECT BASED ON A PHASE OF CHANNEL IMPULSE RESPONSES

(71) Applicant: NXP B.V., Eindhoven (NL)

(72) Inventors: Stefan Tertinek, Graz (AT); Salvatore Drago, Eindhoven (NL); Raf Lodewijk Jan Roovers, Wommelgem (BE)

(73) Assignee: NXP B.V., Eindhoven (NL)

( * ) Notice: Subject to any disclaimer, the term of this patent is extended or adjusted under 35 U.S.C. 154(b) by 241 days.

(21) Appl. No.: 16/872,851

(22) Filed: May 12, 2020

(65) Prior Publication Data

US 2021/0359774 A1 Nov. 18, 2021

(51) Int. Cl.
| | |
|---|---|
| H04L 25/02 | (2006.01) |
| G01S 13/36 | (2006.01) |
| G01S 13/524 | (2006.01) |
| H04B 17/364 | (2015.01) |

(52) U.S. Cl.
CPC ....... H04B 17/364 (2015.01); H04L 25/0212 (2013.01)

(58) Field of Classification Search
None
See application file for complete search history.

(56) References Cited

U.S. PATENT DOCUMENTS

| | | |
|---|---|---|
| 5,513,221 A | 4/1996 | Parr et al. |
| 9,689,982 B2 | 6/2017 | Herthan |
| 10,168,414 B2 | 1/2019 | Chen et al. |
| 2018/0164874 A1* | 6/2018 | Qiu .................. G06F 3/011 |
| 2018/0227714 A1* | 8/2018 | Lee .................. H04W 4/027 |
| 2019/0271774 A1* | 9/2019 | Zhang ............... G01S 13/87 |
| 2019/0271775 A1* | 9/2019 | Zhang .............. G01S 13/003 |
| 2019/0379434 A1* | 12/2019 | Lindskog .......... G01P 13/04 |
| 2020/0145042 A1* | 5/2020 | Kulkarni .......... H04L 25/0212 |
| 2020/0319301 A1 | 10/2020 | Qiu et al. |
| 2021/0014641 A1* | 1/2021 | Choi ................. G01S 13/582 |

OTHER PUBLICATIONS

Lazaro et al., "Analysis of Vital Signs Monitoring Using an IR-UWB Radar," Progress In Electromagnetics Research, PIER 100, pp. 265-284, 2010.
U.S. Appl. No. 16/221,882, filed Dec. 17, 2018.

* cited by examiner

Primary Examiner — Duc T Duong

(57) ABSTRACT

A moving object detector detects a moving object in a channel. The detection comprises the detector receiving a plurality of frames based on a transmitter transmitting a plurality of frames over a channel. One or more channel impulse responses (CIRs) of the channel is determined based on the received plurality of frames. The detector determines a CIR phase for each of the CIRs and a phase signal is formed based on a phase value of the CIR phase for each of the CIRs. The detector compares the phase signal with a target signal and detects the moving object in the channel based on the comparison.

20 Claims, 9 Drawing Sheets

DETECTING A MOVING OBJECT BASED ON A PHASE OF CHANNEL IMPULSE RESPONSES

FIELD OF USE

This disclosure generally relates to moving object detection, and more particularly to detecting a moving object based on a phase of channel impulse responses.

BACKGROUND

Sensor technology exists to measure a distance between a transceiver such as a keyfob carried by a person and a vehicle so that the vehicle is unlocked when the person reaches the vehicle. This same sensor technology also exploits Doppler effect to provide motion information that enables sensing a leg kick at a rear bumper of the vehicle which indicates that the person wants to open a trunk of the vehicle or to detect vital signs of occupants in the vehicle such as breathing rate and heart rate.

Figure 1:
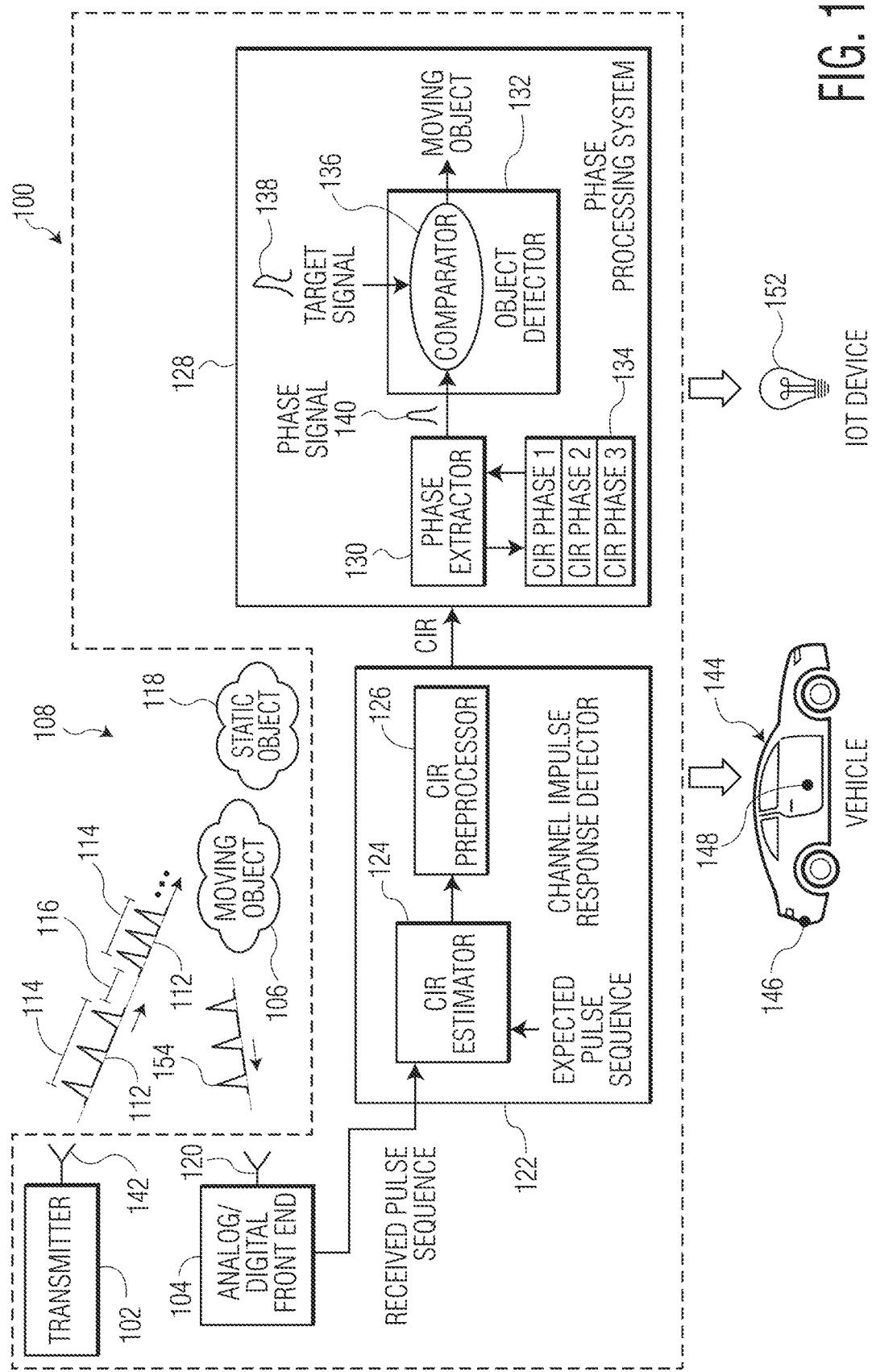
FIG. 1 is an example block diagram of a moving object detector for detecting a moving object.

The drawings are for the purpose of illustrating example embodiments, but it is understood that the embodiments are not limited to the arrangements and instrumentality shown in the drawings.

DETAILED DESCRIPTION

The description that follows includes example systems, methods, techniques, and program flows for moving object detection, and more particularly to detecting a moving object based on channel impulse responses (CIRs) of a channel and particularly a time domain representation of CIR phase of the CIRs. In examples, the CIRs are determined by transmitting radio frequency (RF) pulses and receiving RF pulses based on the transmitted RF pulses reflecting from the moving object. A phase signal of phase values as a function of time is determined based on a time domain representation of the CIR phase of the CIRs. The phase signal is then compared to a target signal to detect the moving object. The detection is performed in the time domain with low power consumption and low memory requirements because the CIRs are not transformed into a frequency domain such as by a fast-Fourier transform (FFT) of the CIRs. Well known instructions, protocols, structures, and techniques have not been shown in detail in order not to obfuscate the description.

Example System

FIG. 1 is an example block diagram of a moving object detector 100 for detecting a moving object. The moving object detector 100 may include one or more components such as a transmitter 102, an analog/digital front end 104, a channel impulse response detector 122, a CIR estimator 124, a CIR preprocessor 126, a phase processing system 128, a phase extractor 130, and an object detector 132. The transmitter 102 may be implemented using circuitry such as analog circuitry, mix signal circuitry, memory circuitry, logic circuitry, and/or processing circuitry that executes code stored in a memory that when executed by the processing circuitry perform the disclosed functions of the transmitter 102. The analog/digital front end 104 may be implemented using circuitry such as analog circuitry, mix signal circuitry, memory circuitry, logic circuitry, and/or processing circuitry that executes code stored in a memory that when executed by the processing circuitry perform the disclosed functions of the analog/digital front end 104. The channel impulse response detector 122 may be implemented using circuitry such as analog circuitry, mix signal circuitry, memory circuitry, logic circuitry, and/or processing circuitry that executes code stored in a memory that when executed by the processing circuitry perform the disclosed functions of the channel impulse response detector 122. The CIR estimator 124 may be implemented using circuitry such as analog circuitry, mix signal circuitry, memory circuitry, logic circuitry, and/or processing circuitry that executes code stored in a memory that when executed by the processing circuitry perform the disclosed functions of the CIR estimator 124. The CIR preprocessor 126 may be implemented using circuitry such as analog circuitry, mix signal circuitry, memory circuitry, logic circuitry, and/or processing circuitry that executes code stored in a memory that when executed by the processing circuitry perform the disclosed functions of the CIR preprocessor 126. The phase processing system 128 may be implemented using circuitry such as analog circuitry, mix signal circuitry, memory circuitry, logic circuitry, and/or processing circuitry that executes code stored in a memory that when executed by the processing circuitry perform the disclosed functions of the phase processing system 128. The phase extractor 130 may be implemented using circuitry such as analog circuitry, mix signal circuitry, memory circuitry, logic circuitry, and/or processing circuitry that executes code stored in a memory that when executed by the processing circuitry perform the disclosed functions of the phase extractor 130. The object detector 132 may be implemented using circuitry such as analog circuitry, mix signal circuitry, memory circuitry, logic circuitry, and/or processing circuitry that executes code stored in a memory that when executed by the processing circuitry perform the disclosed functions of the object detector 132. In some embodiments, some of the components may be implemented with same circuitry such as same processing circuitry executing different sets of code. The components may be implemented in other ways as well.

In examples, the moving object detector 100 may detect a moving object 106 in a channel 108 based on processing of a channel impulse response (CIR) from received transmissions in the channel 108. The CIR represents a channel response of a channel resulting from a transmit antenna 142 of the transmitter 102 transmitting a sequence of pulses 112 and a receive antenna 120 of the analog/digital front end 104 receiving a sequence of pulses 154 based on the transmitted sequence of pulses 112 over the channel 108. The channel 108 may be a transmission medium such as air for the transmitted and received pulses. Further, the channel 108 may have one or more objects, such as a moving object 106 and a static object 118. An object may be a physical structure and in some examples the object may be portion of a larger object. In one example, a person or limb of a person may be an object and the object is a moving object when the person performs a gesture with his limb and a static object when the limb is stationary. In another example, an automobile may be an object and the object is a moving object when the automobile is moving and a static object when the vehicle is stationary. The moving object 106 and the static object 118 may affect the CIR as a result of the transmitted pulse sequence 112 reflecting off one or more objects in the channel 108 such as the moving object 106 and any static objects 118. For example, a magnitude of one or more pulses of the transmitted pulse sequence 112 may change due to reflection on the moving object 106 and the static object 118 resulting in the pulse sequence 154 which is received by the receive antenna 120 changing. As another example, a phase associated with the transmitted pulse sequence 112 may change due to reflection on the moving object 106 and a Doppler effect resulting in the pulse sequence 154 which is received by the receive antenna 120 changing.

The transmitter 102 may transmit the one or more pulses 112 over the channel 108 via the transmit antenna 142. In examples, each pulse may be an increasing amplitude followed by decreasing amplitude of an electromagnetic wave or a decreasing amplitude followed by an increasing amplitude of the electromagnetic wave and a sequence of pulses being such bursts of electromagnetic waves. The transmitter 102 may transmit two sequences 112 as shown, but more or less sequences may be transmitted with each being the same or different. The transmitted pulse sequence 112 may be arranged as a frame 114 of pulses and in examples the transmitter 102 may transmit a plurality of frames 114 separated by a time interval 116 where each frame 114 comprises a respective sequence of pulses 112. In some examples, the time interval 116 between frames 114 may be fixed such as 1 millisecond between frames 114 or variable between frames 114. Further, in some examples, the Institute of Electrical and Electronics Engineers (IEEE) 802.15.4 standard may specify an example format for the frame 114. The frame 114 may have a format of one or more fields such as a preamble and data payload. The preamble may include one or more symbols where each symbol may be the same and be defined by one or more ternary codes. In examples, the preamble of the frame 114 may have up to 512 symbols and the pulse sequence 112 may represent one or more symbols in the preamble of the frame 114.

In examples, the transmitter 102 may be arranged to transmit the sequence of one or more pulses 112 by modulation on a carrier wave to form radio frequency (RF) pulses. The RF pulses may be synthesized from two amplitude modulated sinusoid carrier waves that are offset in phase, referred to as an in-phase component and a quadrature component or from amplitude modulated sinusoid carrier waves which are in phase. In some examples, the pulses may have a bandwidth of 500 MHz and transmitted with a carrier frequency in a range of 3.1 GHz to 10.6 GHz associated with ultrawide band (UWB) radar systems.

The receive antenna 120 and analog/digital front end 104 may receive the sequence of pulses 154. The sequence of pulses 154 is exemplary in nature, and the sequence may depend on characteristics of the moving object 106 and static object 118. Further, in examples, a sequence of pulses such as the sequence of pulses 154 may define a frame. The receive antenna 120 may be arranged as a chip receive antenna on a printed circuit board (PCB), for example. In some examples, the analog/digital front end 104 may be a component of a real receiver to demodulate the pulse sequence 154 when the pulse sequence 112 is modulated in phase on a carrier wave. In some examples, the analog/digital front end 104 may be a component of a complex receiver to demodulate the pulse sequence 154 when the pulse sequence 112 is modulated on a carrier wave in phase (I) and in quadrature (Q). The analog/digital front end 104 may include one or more signal processing components such as a low noise amplifier, mixer, local oscillator, filter, and analog-to-digital converter to facilitate this demodulation.

The analog/digital front end 104 may provide the received pulse sequence to the channel impulse response detector 122. In examples, the received pulse sequence may be defined by a digital signal of data samples. The channel impulse response detector 122 may determine the CIR of the channel 108 based on a CIR estimator 124 and a CIR preprocessor 126. The CIR estimator 124 may determine the CIR. Inputs to the CIR estimator may be the received pulse sequence and an expected pulse sequence. In examples, the expected pulse sequence may indicate the transmitted pulse sequence 112 such as a symbol in the preamble of the frame 114 transmitted by the transmitter 102. The expected pulse sequence may be stored in a memory (not shown) associated with the CIR estimator 128 during a configuration of the channel impulse response detector 122 and updated if the transmitted pulse sequence 112 changes. The CIR estimator 124 may perform a cross correlation between the received pulse sequence and the expected pulse sequence to estimate the CIR. In some examples, the cross correlation may be a function of displacement of the received pulse sequence relative to the expected pulse sequence and a measure of similarity of one with respect to the other.

The estimated CIR may be defined by complex numbers with a real and imaginary part in a Cartesian coordinate system. In examples, the estimated CIR may then be input into the CIR preprocessor 126 which preprocesses the CIR. The preprocessing by the CIR preprocessor 126 may include application of one or more filters such as a moving average filter or a low pass filter to the CIR. The moving average filter operates by averaging a number of points from the input signal to produce each point in the output signal. The points from the input signal may be the real components of the CIR and the output signal may have reduced high frequency noise. Alternatively, the points from the input signal may be the imaginary components of the CIR and the output signal may have reduced high frequency noise. The low pass filter may be a frequency response applied to the CIR which reduce high frequency noise of the CIR. Similarly, the low pass filter may be applied to the real or imaginary components of the CIR. The CIR processed by the CIR preprocessor 126 may be output to the phase processing system 128.

The phase processing system 128 may be arranged with a phase signal extractor 130 and an object detector 132. The phase processing system 128 may receive the CIR from the CIR detector 122 and detect the moving object 106 between the transmitter 102 and the analog/digital front end 104. The phase extractor 130 may determine a CIR phase as phase values as a function of time by converting one or more of the complex numbers of the CIR to a respective phase value associated with a polar coordinate system. An amplitude of the phase value may indicate a velocity of the moving object with a higher amplitude indicating a higher velocity and a lower amplitude indicating a lower velocity. In examples, the phase extractor 130 may perform the conversion by a coordinate rotation digital computer (CORDIC) which converts the complex numbers of the CIR from the Cartesian coordinate system to the polar coordinate system. The phase extractor 130 may store the CIR phase of the CIR in a memory 134 of the phase processing system 128 as CIR phase 1 . . . N. Memory 134 shows three CIR phase 1, CIR phase 2, and CIR phase 3, stored in the memory 134 in this example, but a more or less number of CIR phases may be stored. The phase extractor 130 may determine a phase signal 140 based on a phase value associated with one or more of the CIR phases stored in the memory 134. The phase signal 140 may be a time varying signal which characterizes how a phase value of the CIR phase of a respective CIR varies over time. In some examples, the phase signal 140 may be processed by a filter such as a low pass filter to reduce noise associated with the phase signal. The low pass filter may have a same frequency response as the lowpass filter used by the CIR preprocessor 126 or have a different frequency response.

The phase signal 140 may be provided to the object detector 132 which determines whether the phase signal 140 indicates presence or absence of a moving object in the channel 108. The object detector 132 may have a comparator 136 to compare the phase signal 140 to a target signal 138. The target signal 138 may be a time varying signal of phase values that would be produced as a result of a specific object moving in the channel 108. In examples, the target signal 138 may be stored in a memory (not shown) of the phase processing system 128 during a configuration of the phase processing system 128 and/or updated based on the particular moving object to detect. The object detector 132 may access this target signal and provide to the comparator 136. The comparator 136 may compare the target signal 138 with the phase signal 140. Based on the comparison of the phase signal 140 and the target signal 138 which in examples define a respective set of data points, a determination is made whether the specific moving object is detected. If the phase signal 140 and the target signal 138 are "similar" as described in further detail below, then a determination is made that the moving object is detected. If the comparison of the phase signal 140 and the target signal 138 are not "similar" as described in further detail below, then a determination is made that the moving object is not detected. The object detector 132 may output an indication of this detection.

In examples, the phase signal comprise phase values as a function of time and the target signal comprises phase values as a function of time which are compared to detect the moving object. In this regard, the phase signal and target signal are in a time domain. Further, the phase signal is determined based on CIRs which are not transformed into a frequency domain such as a fast-Fourier transform (FFT). Because a frequency domain transformation is not performed to detect the moving object the detection requires low power consumption and low memory requirements. Detection of the moving object by transforming the CIRs into a frequency domain (e.g., complex numbers as a function of frequency) and analysis thereof to detect the moving object increases power and/or memory requirements.

In examples, the moving object detector 100 may be a subsystem of a larger system. In one application, the moving object detector 100 may be located on a vehicle 144 to sense a moving object with respect to the vehicle 144. For instance, the moving object detector 100 may be positioned on a rear bumper 146 of the vehicle 144 to facilitate sensing a leg kick under the rear bumper 146. The leg kick may indicate that a person wants to open a trunk of the vehicle 144 and the moving object to detect is the leg. Additionally, or alternatively, the moving object detector 100 may be located in an interior 148 of the vehicle 144 to facilitate detecting vital signs of an occupant in the vehicle 144 such as his breathing rate and heart rate. In another application, the moving object detector 100 may be located on a computing device such as Internet of things (IOT) devices 152 such as a lamp as shown or security device to facilitate detection of motion which turns on the light or activates an alarm, respectively.

In examples, one or more of the transmitter 102, analog/digital front end 104, channel impulse response detector 122, and phase processing system 128 may be implemented on a same integrated circuit (IC) or a separate respective IC. If the components are implemented on a same IC (e.g., to form a transceiver), then the transmitter 102 and the analog/digital front end 104 may also be synchronized in phase to facilitate transmission and reception of the pulse sequence 112. The synchronization may be provided by a local oscillator shared by the transmitter 102 and the analog/digital front end 104 on the IC. If the transmitter 102 and the analog/digital front end 104 are on the separate respective IC, then the transmitter 102 and the analog/digital front end 104 may also be synchronized in phase to facilitate transmission and reception of the pulse sequence 112. The transmitter 102 and the analog/digital front end 104 in this example may share an oscillator or have separate oscillators that are further synchronized. Further, in some examples, one or more circuitry associated with the transmitter 102, analog/digital front end 104, channel impulse response detector 122, and phase processing system 128 may be separated by a network such as a local interconnect network (LIN) or controller area network (CAN). For instance, the CIR output by the CIR estimator 124 circuitry may be transmitted over a network to an electronic control unit (ECU) which has circuitry associated with the channel impulse response detector 122 and phase processing system 128 to detect the moving object 106.

In examples, the transmitter 102 and the analog/digital front end 104 may also share a common antenna instead of using the respective antenna shown as transmit antenna 142 and receive antenna 120 to transmit and receive the pulse sequence 112. The transmitter 102 and the analog/digital front end 104 may be coupled to this shared antenna and transmission and reception may be time multiplexed over this shared antenna. Further, one of antenna 120 or antenna 142 may include two or more antennas in some examples.

Figure 2:
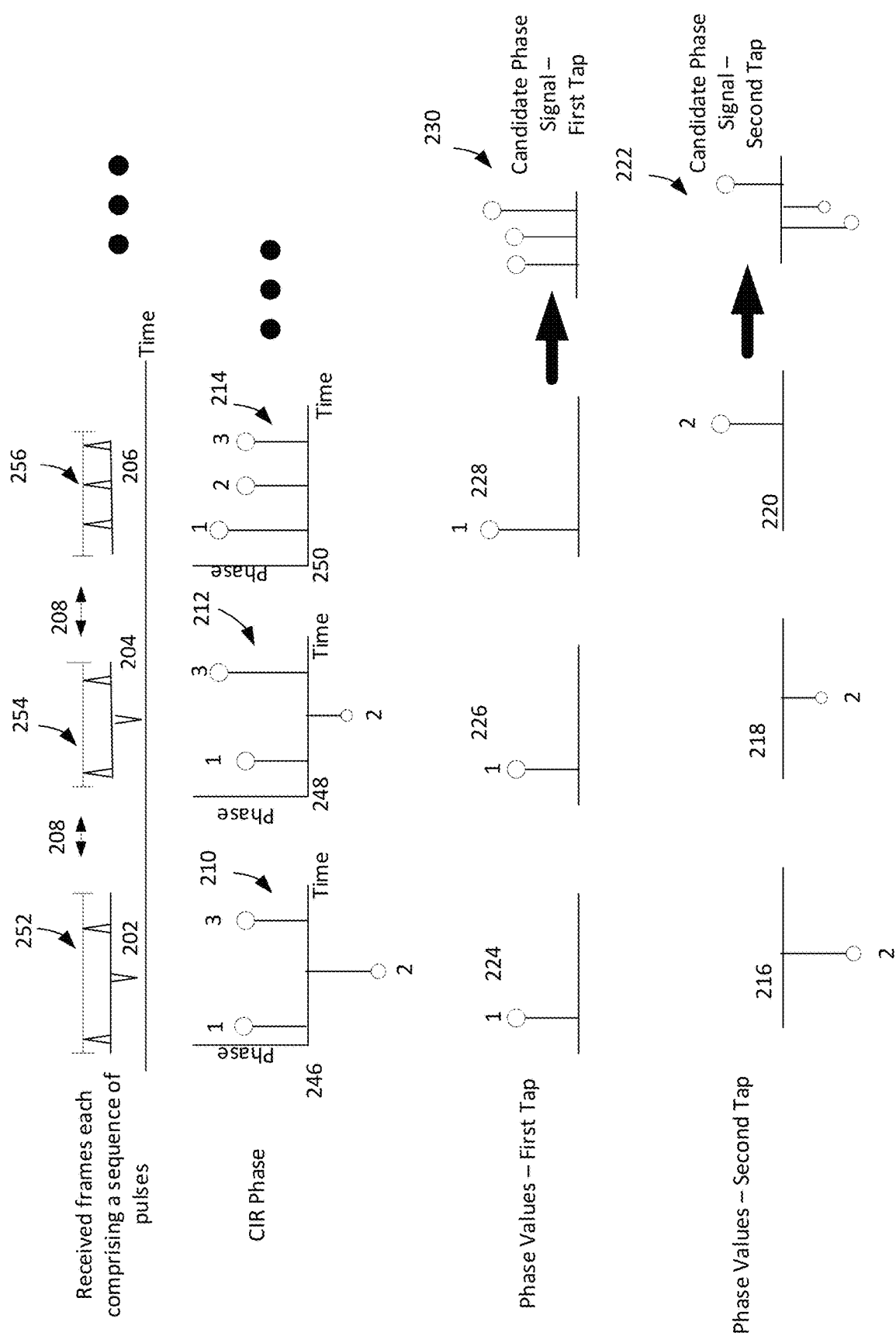
FIG. 2 illustrates in more detail how a phase signal is generated by the moving object detector.

FIG. 2 illustrates in more detail how the phase signal is generated in the moving object detector 100. The transmitter 102 may transmit the plurality of frames 114 which results in the analog/digital front end 104 receiving a plurality of frames 252-256 (which are analogous to sequence of pulses 154) via the receive antenna 120 based on the transmitted plurality of frames 114. Each frame of the plurality of frames 252-256 may be associated with a respective sequence of pulses such as one of the sequence of pulses 202-206. Further, each frame may be separated by a fixed time interval 208 which may be 1 millisecond in some examples. In other examples, the time interval 208 may be variable.

The transmitted sequence of pulses 112 may be known to the CIR estimator 124 as the expected pulse sequence. The CIR estimator 124 may correlate the expected pulse sequence with a received pulse sequence of a frame 252-256 from the antenna 120 to determine a respective CIR of the channel 108 between the transmitter 102 and the receive antenna 120. For example, the CIR estimator 124 may correlate the received sequence of pulses 202 with the expected pulse sequence to determine a CIR. In some examples, the received sequence of pulses 202 may include one or more repeated subsequences of pulses, each of which might correspond to a same symbol. The repeated subsequences may be averaged together to remove noise and the averaged subsequence may be correlated with the expected pulse sequence to determine the CIR associated with a frame. In this example, a CIR may be determined for frame 252 with pulse sequence 202, a CIR may be determined for frame 254 with pulse sequence 204, and a CIR may be determined for frame 256 with pulse sequence 206.

A CIR may be represented by a plurality of complex numbers and the phase extractor 130 may determine for each complex number a phase value which may range from −180 to 180 degrees or some other range in examples. The aggregation of the phase values defines a CIR phase. Example CIR phases are shown as CIR phase 246, CIR phase 248, and CIR phase 250 which correspond to frame 252, frame 254, and frame 256 respectively. This process may be repeated as additional frames comprising a respective sequence of pulses are received.

Each complex number to form a CIR phase may have an time index. The time index may define a time position in the CIR. The phase value associated with that complex number may have an associated time index. The time index may define a time position in the CIR phase. In this regard, the CIR phase 246 may be plot of phase values 210 (i.e., amplitude of phase) as a function of time index along a time axis. In examples, the time index may be also referred to as a tap number which uniquely identify each phase value of the phase values 210. For example, the first phase value may be labeled as tap 1, the second phase value may be labeled as tap 2, the third phase value may be labeled as tap 3 etc. with N=3 tap values. The same tap number of phase values in multiple CIR phase 246-250 indicates that the complex number used to generate the phase values has same time index in a respective CIR. For instance tap 2 in CIR phase 246, 248, and 250 may correspond to a complex number in a respective CIR with time index 2.

In examples, phase values may be selected with a same tap number across multiple CIR phases. To illustrate, tap 1 associated with each of the CIR phase 246-250 may be selected as shown by phase value 224-228. The phase values 216-220 may aggregated to form a candidate phase signal 230. In some examples, the phase extractor 130 may interpolate the phase values to define the candidate phase signal 230. This process may be repeated for tap 2 selected for each CIR phase as shown by phase value 216-220. The phase values 216-220 may be aggregated to form a candidate phase signal 222. This process may continue for other taps such as tap 3 selected for each CIR phase, tap 4 selected for each CIR phase and so on. The phase extractor 130 may then select one of the candidate phase signals to output as the phase signal which is then compared with the target signal to detect a moving object. In some examples, the selection may be based on an amplitude of one or more of the candidate phase signals. For instance, the selected phase signal may be the one phase signal of the candidate phase signals which has a highest amplitude compared to the other candidate phase signals. As another example, the selected phase signal may be the one phase signal of the candidate phase signals which has a maximum power. As yet another example, the selected phase signal may have a maximum amplitude or power that exceeds a threshold level. The selection may be based on other criteria as well in addition to or instead of amplitude and/or power.

The comparison of the phase signal with the target signal may include a value indicative of correlation between the phase signal and the target signal. The comparison may involve calculating a normalized absolute error between the phase signal and the target signal. If the normalized absolute error is less than a threshold amount, then the phase signal matches the target signal. If the normalized absolute error is not less than a threshold amount, then the phase signal does not match the target signal. The comparison of the phase signal with the target signal may alternatively include applying a matched filter associated with the target signal to the phase signal process. Match filtering is a process for detecting a known signal, i.e., target signal, that is embedded in noise. The match filter applied to the phase signal may indicate a degree of match between the target signal and the phase signal. If the degree of match exceeds a threshold amount, then the moving object is detected. If the degree of match does not exceeds a threshold amount, then the moving object is not detected. The comparison between the phase signal and the target signal may be performed in other ways as well.

In examples, the moving object detector 100 may take the form of a UWB radar sensor which operates in a 6.5 GHz band. Further, in some examples the moving object detector 100 may be mounted on a rear bumper 146 of a vehicle 144. In this example, the transmitter 102 transmits a plurality of sequences of pulses. The analog/digital front end 104 may receive a plurality of sequences of pulses based on the transmitted plurality of sequences of pulses and the moving object detector 100 may determine whether to open a trunk. For instance the object detector 132 may compare a phase signal determined based on the transmitted plurality of sequences of pulses and received plurality of sequences of pulses and a target signal indicative of leg kick. If the object detector 132 determines a match between the phase signal and target signal, then the trunk is opened. If the object detector 132 does not determine a match between the phase signal and target signal, then the trunk is not opened.

Figure 3A:
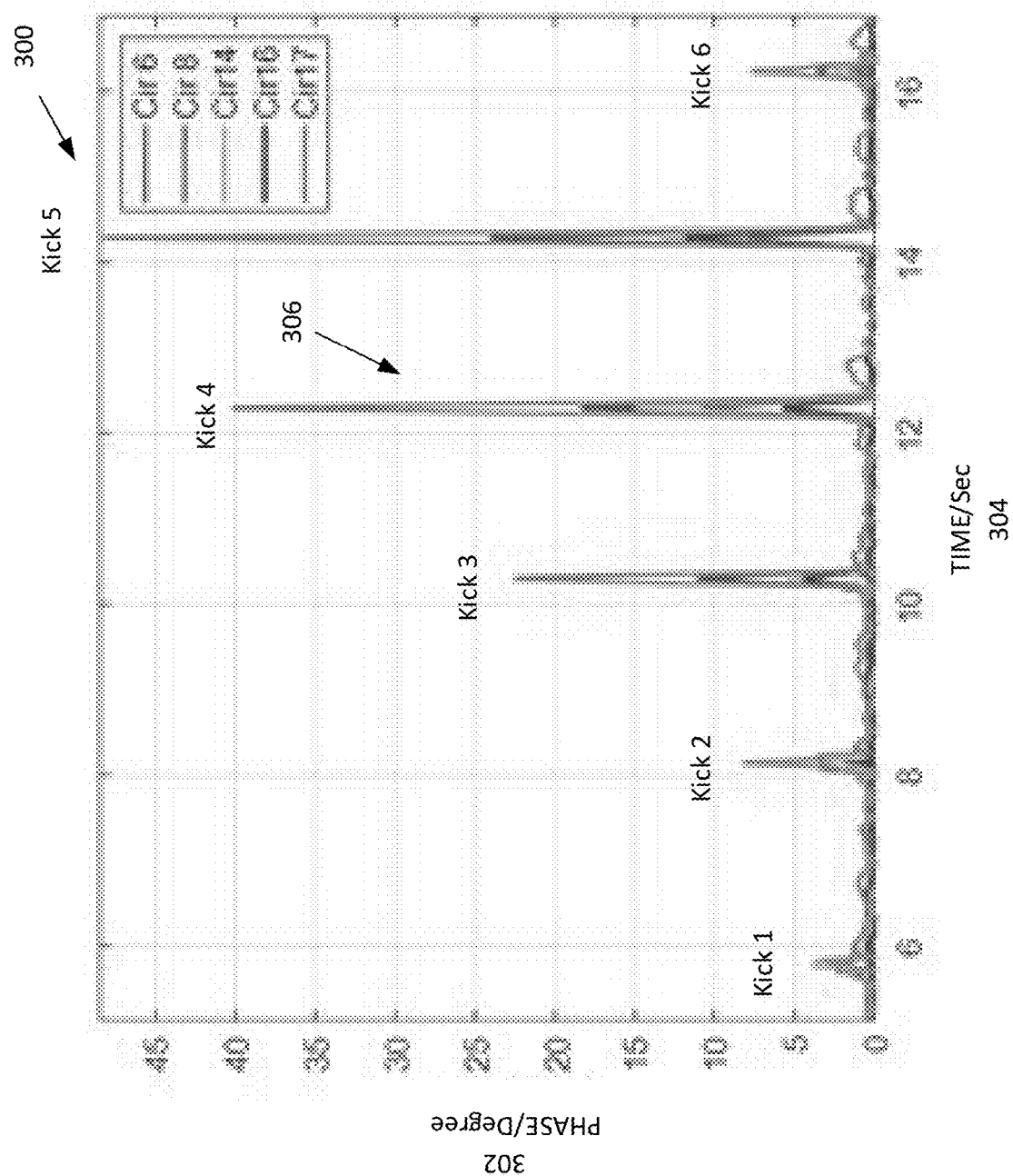
FIG. 3A-3C show example phase signals determined as a result of a person performing multiple kicks of increasing speed toward the moving object detector mounted on a rear bumper of a vehicle.
Figure 3B:
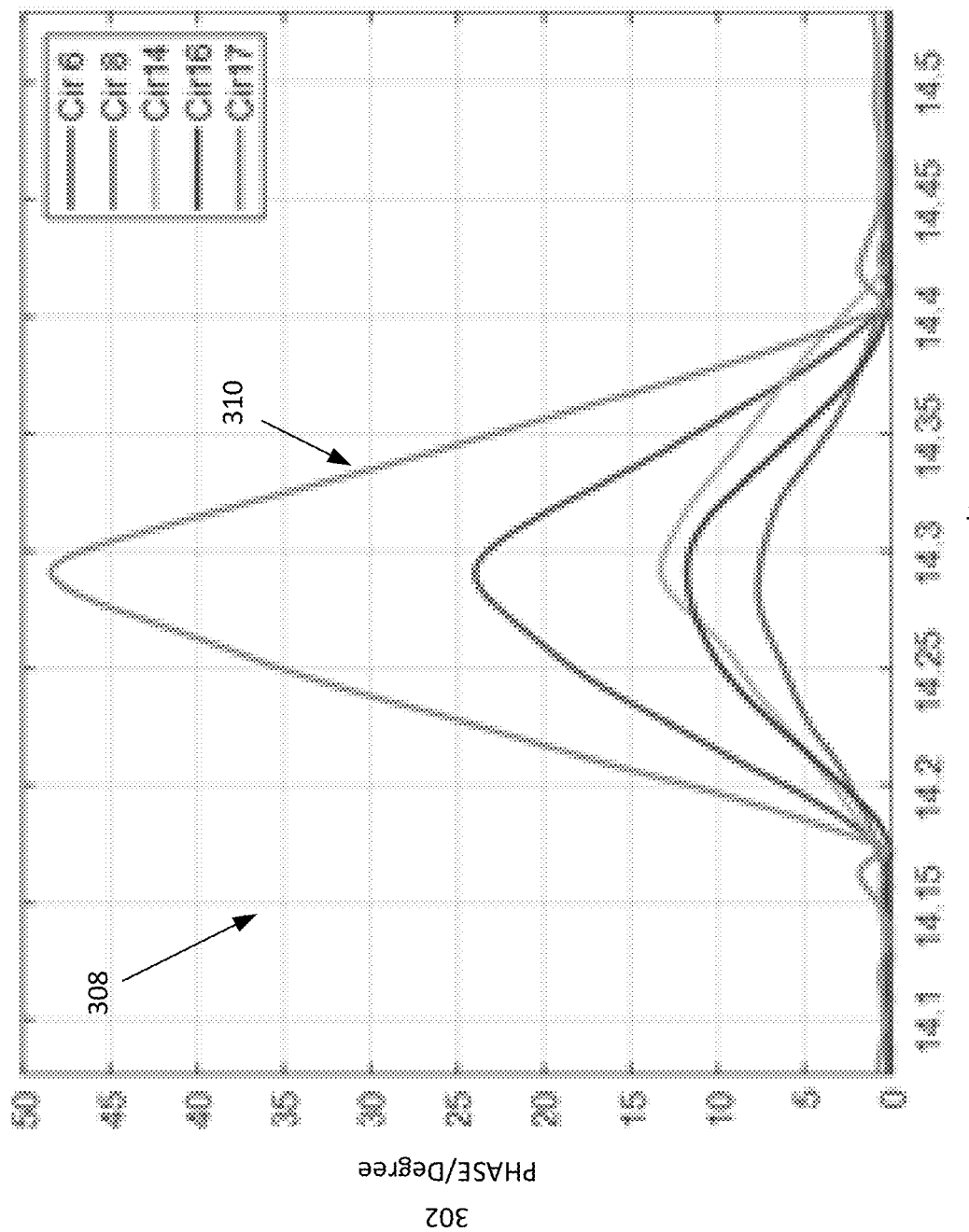
Figure 3C:
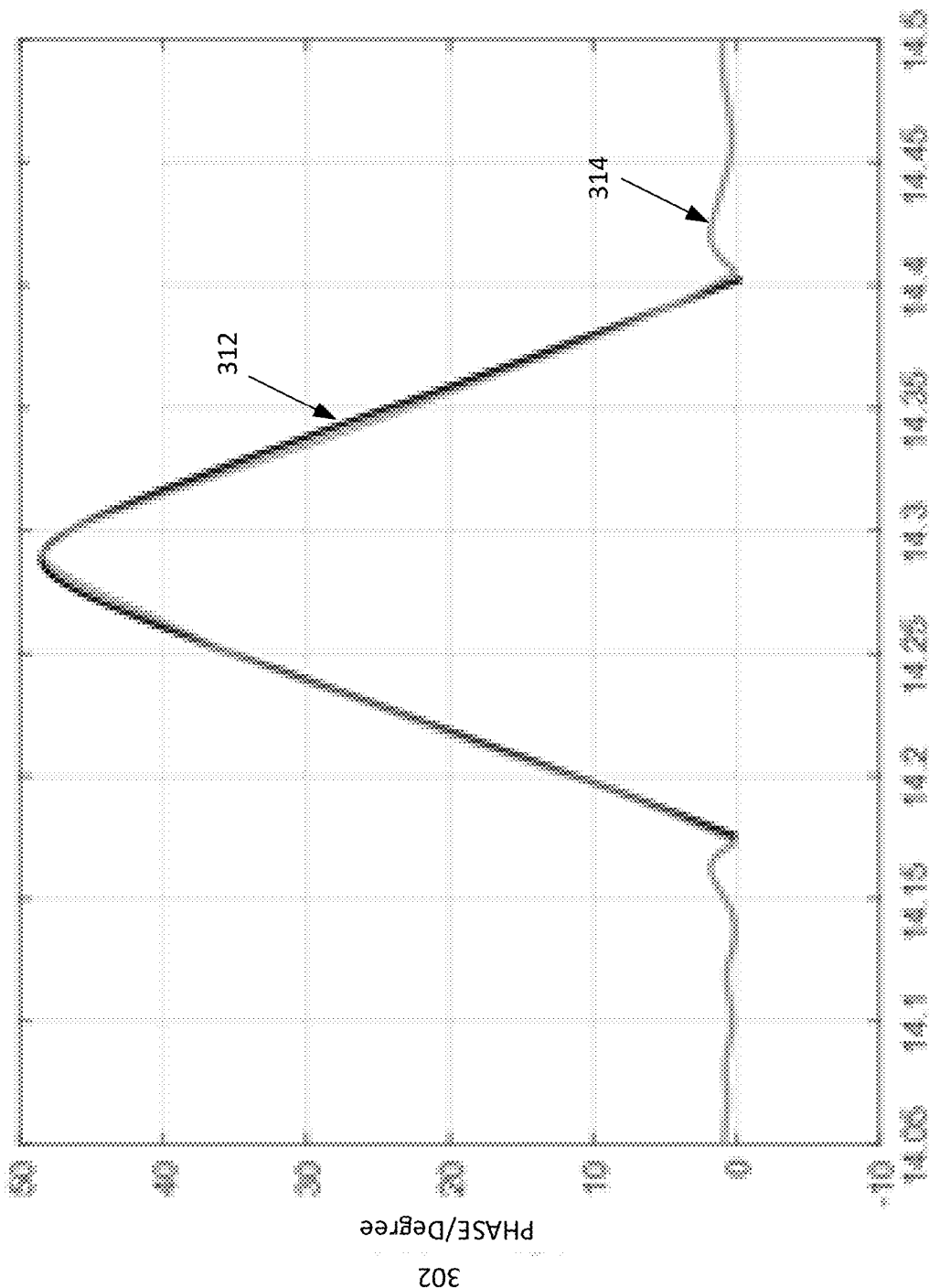

FIGS. 3A-3C show example phase signals determined as a result of a person performing multiple kicks of increasing speed toward the moving object detector 100 mounted on the rear bumper of the vehicle. The example phase signals may be compared to a target signal to determine whether a leg kick is detected.

FIG. 3A shows a plurality of example phase signals 300 determined by the detector 100 resulting from a leg kick of increasing speed toward a rear bumper of the vehicle. The phase signals 300 are plotted as a function of phase value along axis 302 and time along axis 304. A CIR may be determined for each received pulse sequence as correlated with a respective transmitted pulse sequence. A phase value such as tap N in each CIR phase of each CIR may be used to determine a phase signal. For example, tap 17 shown as CIR 17 may define a phase signal associated with each kick, shown as kicks 1-6, and phase signal 306 for kick 4. Also shown are phase signals for taps 6, 8, 14, and 16 identified by CIR 6, CIR 8, CIR 14, and CIR 16. The phase signal of each kick has a peaked shape and a magnitude of the phase of the peak increases with time and speed of the kick.

FIG. 3B shows an example zoomed in view of phase signals 308 for one of the kicks. The phase signals 308 are plotted as a function of phase value along axis 302 and time along axis 304. The phase signals 308 have an increasing phase slope as a leg associated with the kick moves toward the moving object detector 100 and a decreasing phase slope as the leg moves away from the moving object detector 100. The increasing phase slope is due to increased Doppler frequency shift which results in an increasing phase shift of the carrier frequency of the received pulses and indicative of higher velocity. Analogously, the deceasing phase slope is due to decreasing Doppler frequency shift of the carrier frequency of the received pulses which results in a decreasing phase shift and indicative of lower velocity. In this example, the phase signal 310 associated with CIR 17 may have a maximum phase shown by phase value of 48 degrees and selected by the phase extractor 130.

FIG. 3C shows an example comparison between a target signal 312 indicative of a kick and the phase signal 314 output by the phase extractor 130. The target signal 312 may define phase values as a function of time indicative of the kick in this example. The target signal 312 and the phase signal 314 are plotted as a function of phase value along axis 302 and time along axis 304. By the object detector 132, the phase signal 314 may be compared to the target signal 312 to determine whether a moving object associated with the target signal was detected. If an indication of the comparison exceeds a threshold amount, then the moving object associated with the target signal is detected. If an indication of the comparison does not exceed a threshold amount, then the moving object associated with the target signal is not detected.

Figure 4A:
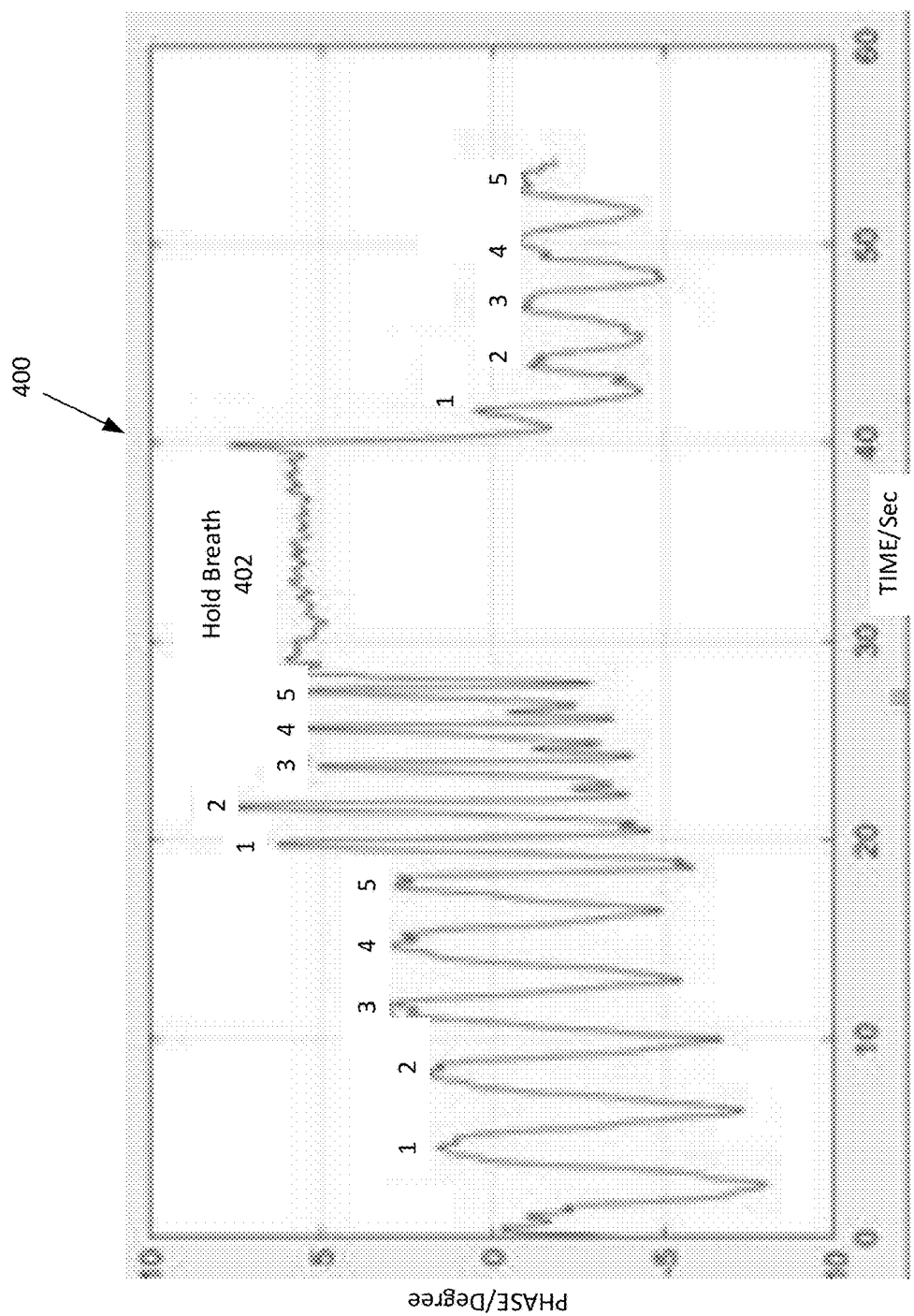
FIG. 4A-B shows detection of vital signs such as a heart rate or breathing rate of a person based on example phase signals.
Figure 4B:
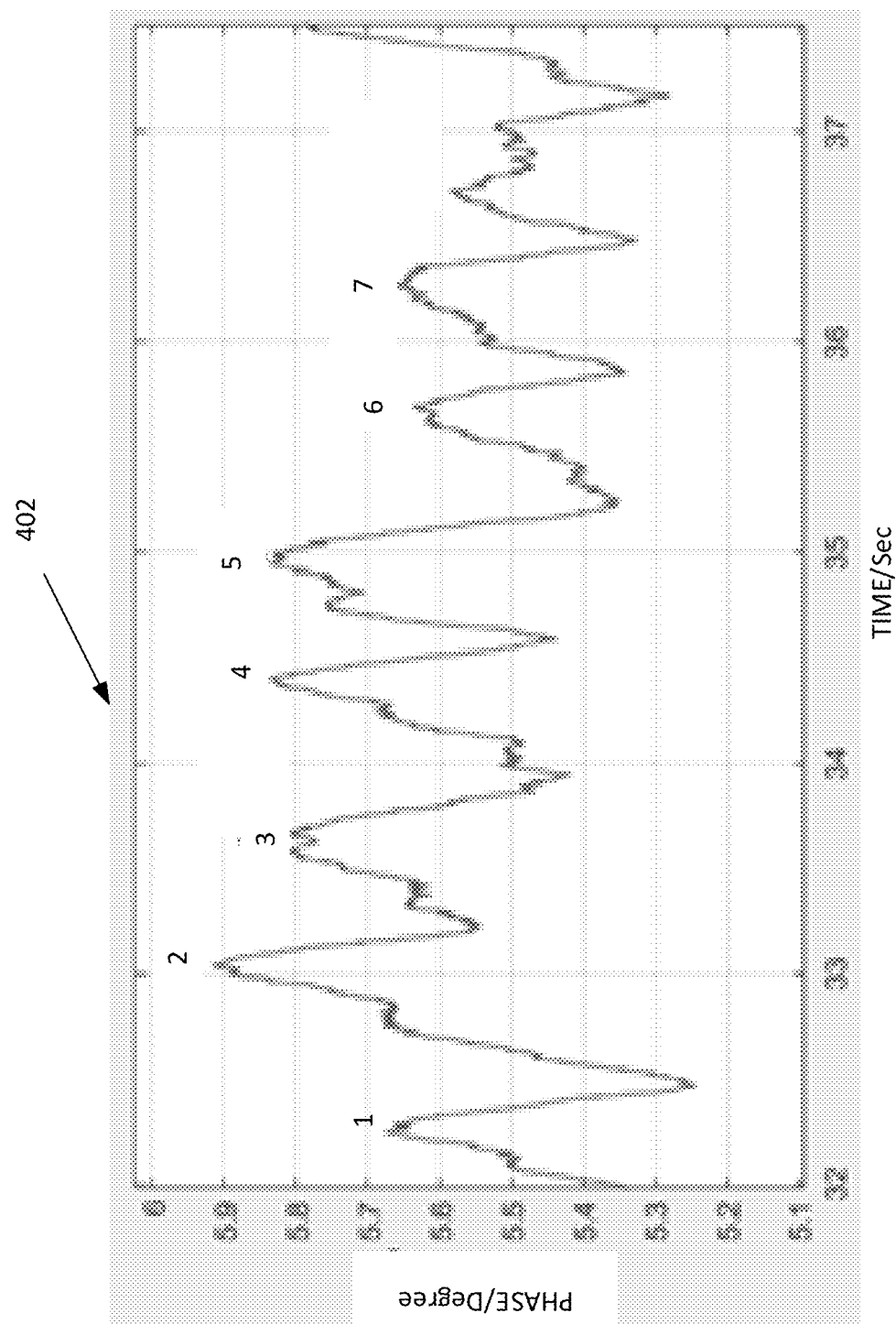

FIG. 4A-B shows detection of vital signs such as a heart rate or breathing rate of a person based on phase signals output by the phase extractor 130. The human being may be in a vehicle, a transmitter 102 in the vehicle may transmit a plurality of frames each having a sequence of pulses, and the analog/digital front end 104 in the vehicle may receive a plurality of frames each having a sequence of pulses based on the transmitted frames. A human subject may be sitting quietly and breathing according to an example pattern 5× normal->5× fast->hold breath->5× normal. The phase extractor 130 may determine a phase signal based on the transmitted frames and the received frames.

FIG. 4A shows the phase signal 400 associated with a tap of the CIR phase for a plurality of CIRs. The phase signal 400 is indicative of a moving object in the vehicle. In this example, periodic phase peaks 1-5 correspond to a moving object in the form of a respiration or a breathing pattern of an occupant in the vehicle FIG. 4B shows a zoom of the phase signal 400 during the "hold breath" part 402 of FIG. 4A. Peaks 1-7 during the "hold breath" part 402 are indictive of a moving object in the form of beating heart which is around 7 beats per 4 seconds, or 105 bpm.

In this regard, the detector 100 has a resolution to detect vital signs of the occupant in the vehicle such as breathing rate and even a heart rate without having to perform an FFT by matching the phase signal 400 with a target signal both phase values as a function of time. The moving object detection is performed with lower power and lower memory requirements as well compared to in a frequency domain.

Example Operation

Figure 5:
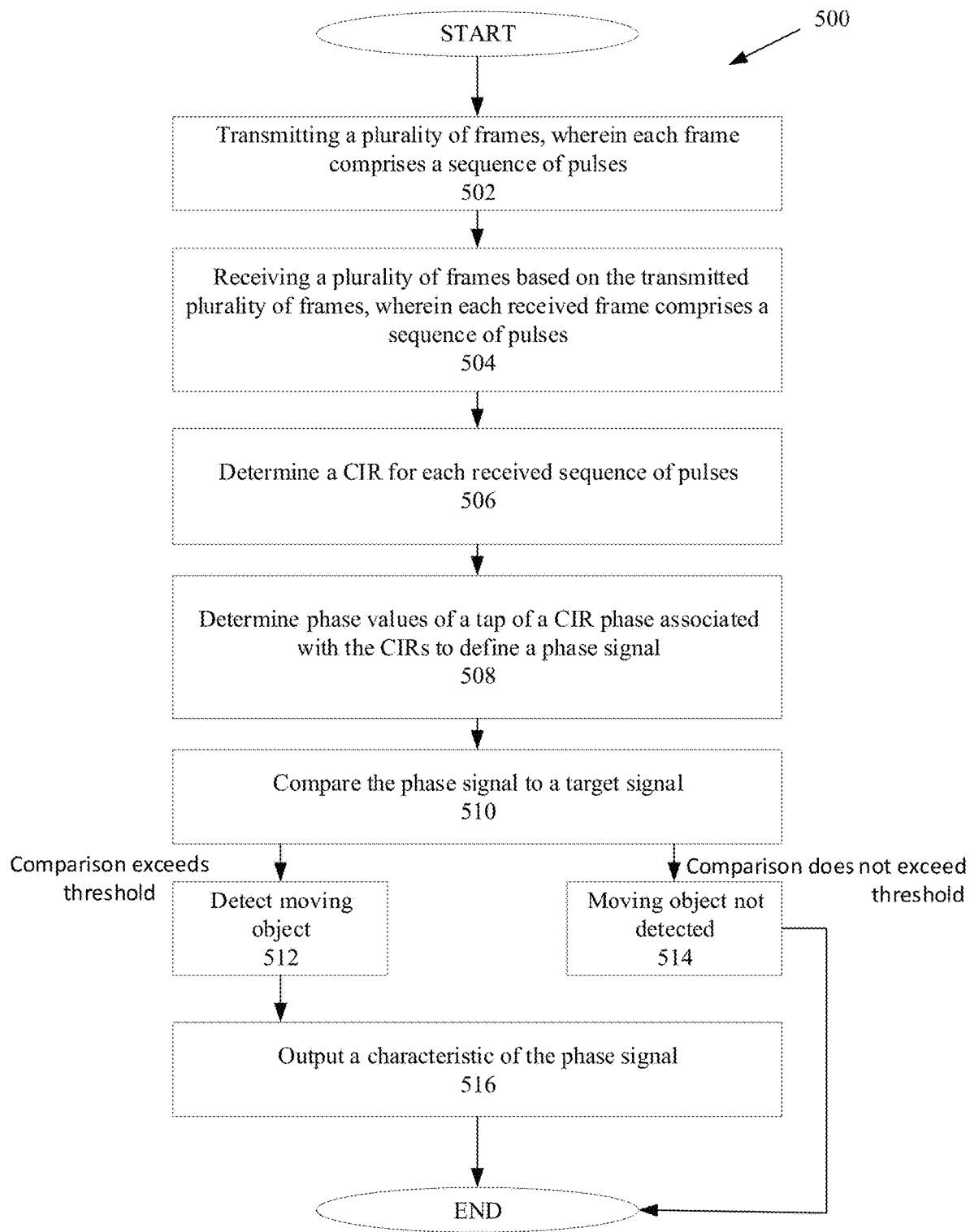
FIG. 5 is an example flow chart of functions associated with detecting the moving object by the moving object detector.

FIG. 5 is an example flow chart of functions 500 associated with detecting a moving object by the detector 100. In examples, a function of the functions 500 may be implemented using circuitry such as analog circuitry, mix signal circuitry, memory circuitry, logic circuitry, and/or processing circuitry that executes code stored in a memory that when executed by the processing circuitry perform the disclosed functions.

At 502, a transmitter 102 transmits a plurality of frames. Each frame comprises a sequence of pulses which are modulated on a carrier wave which has a carrier frequency. The transmitter 102 transmits the sequence of pulses over a channel 108.

At 504, the analog/digital front end 104 receives a plurality of frames based on the transmitted plurality of frames. Each received frame may comprise a sequence of pulses received based on a respective transmitted sequence of pulses. In examples, a transmitted sequence of pulses may be received directly by the receive antenna 120 as a received sequence of pulses or as a result of reflection in a path between the transmitter 102 and receive antenna 120 on static objects 118 and/or moving objects 106 in the channel 108.

At 506, a CIR is determined for each received sequence of pulses. The CIR estimator 124 may determine the CIR. The CIR may be based on a correlation between a received sequence of pulses and a respective expected sequence of pulses. In some examples, the CIR preprocessor 126 may preprocess the CIR with a filter such as a low pass filter or running average filter to remove noise in the CIR.

At 508, phase values of a tap of a CIR phase associated with the CIRs is determined to define a phase signal. The phase signal may be determined by the phase extractor 130. In some examples, the phase extractor 130 may determine a plurality of candidate phase signals each associated with a different tap of the CIR phase associated with the CIRs and the phase signal with maximum amplitude or maximum power may be the phase signal output by the phase extractor 130. A phase value of the phase signal may indicate a velocity of a moving object over time. In some examples, the phase signal may be further preprocessed by a filter such as a low pass filter to remove noise in the phase signal.

At 510, the phase signal is compared to a target signal. The target signal may be a predefined signal indicative of a type of motion such as a kick of a leg, a breathing rate, or a heart rate, as examples. The comparison performed by the object detector 132 may indicate a degree of correlation between the phase signal and the target signal. The comparison may be based on a matched filter or normalized absolute error calculation in examples.

If the comparison indicates that the degree of correlation exceeds a threshold amount, then at 512, the moving object associated with the target signal is detected. For example, the comparison may indicate that a kick is detected, a heart rate is detected, or a breathing pattern is detected. If the comparison indicates that the degree of correlation does not exceed a threshold amount, then at 514, the moving object associated with the target signal is not detected.

At 516, a characteristic of the phase signal is output. The characteristic may be an amplitude of the phase signal indicative of velocity of the moving object or a frequency of peaks in a plurality of phase signals indicative of a breathing rate or heart rate of a person. The characteristic may be used to perform additional actions. For example, if a kick is detected of a certain velocity, a trunk of a vehicle may be opened. As another example, if a breathing rate or heart rate is detected and the vehicle is locked, then the door may be unlocked to allow an occupant to exit the vehicle. Other variations are also possible.

Figure 6:
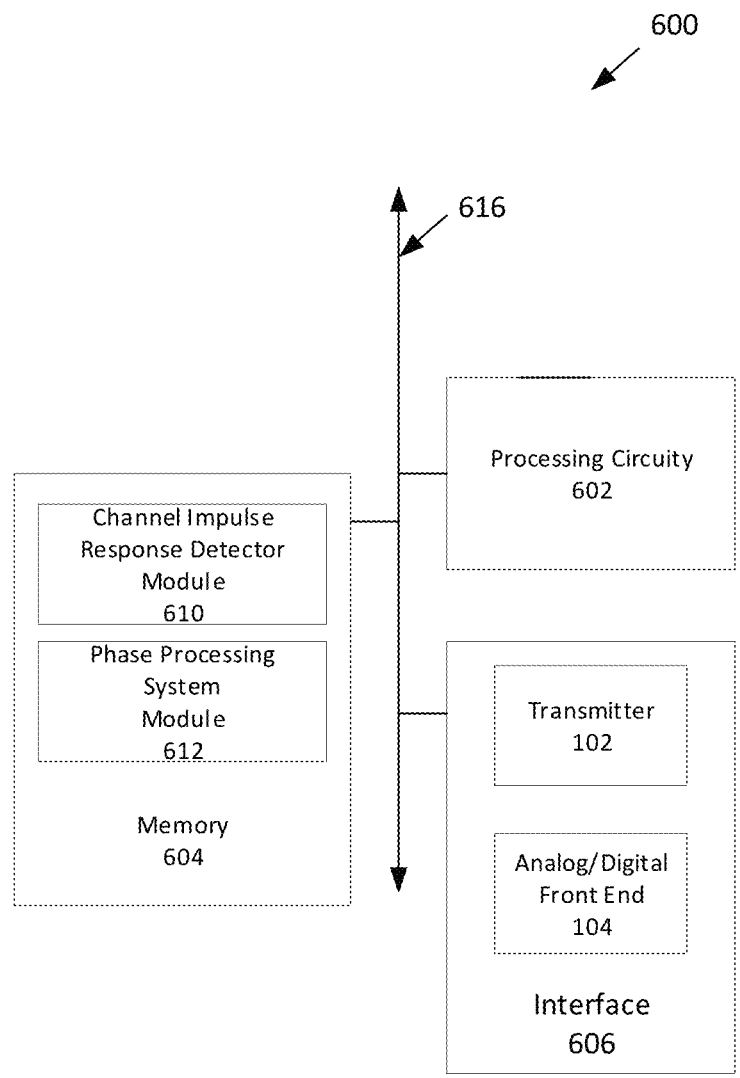
FIG. 6 is a block diagram of an example apparatus for detecting the moving object.

FIG. 6 is an example block diagram of a computer apparatus 600 such as the moving object detector 100 which performs functions associated with determining the moving object. The computer apparatus 600 may have processing circuitry 602 (possibly including multiple processors, multiple cores, multiple nodes, and/or implementing multi-threading, etc.) and memory 604 such as system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more other possible realizations of non-transitory machine-readable media/medium. The memory 604 may store computer code, program instructions, computer instructions, program code for performing one or more operations or control of operations associated with the channel impulse response detector 122 or phase processing system 128 via respective software modules 610-612. The computer apparatus 600 also includes a bus 616 (e.g., PCI, ISA, PCI-Express) which couples the processing circuitry 602, memory 604 and an interface 606. The interface 606 may include the transmitter 102 and analog/digital front end 104 which receives pulses to transmit from the bus 616 and sends pulses to transmit over the bus 616 in some examples.

In one embodiment, a method to detect a moving object is disclosed. The method comprises: receiving, by a moving object detector, a plurality of frames transmitted over a channel; determining, by the detector, one or more channel impulse responses (CIRs) associated with the channel based on the received plurality of frames; determining, by the detector, a CIR phase for each of the CIRs; forming, by the detector, a phase signal based on a phase value of the CIR phase for each of the CIRs; comparing, by the detector, the phase signal with a target signal; and detecting, by the detector, the moving object in the channel based on the comparison. In an embodiment, the phase value of the CIR phase for each of the CIRs that define the phase signal are located in a same time position in each of the CIR phases. In an embodiment, the CIR phase and the phase signal define phase values that vary as a function of time. In an embodiment, the method of forming the phase signal comprises forming a first candidate phase signal and a second candidate phase signal, wherein the first candidate phase signal is associated with phase values located at only a first time position in each of the CIR phases and the second candidate phase signal is associated with phase values located at only a second time position in each of the CIR phases; and selecting the first or second candidate phase signal as the phase signal based on a respective amplitude or power associated with the first or second candidate phase signal exceeding a threshold level. In an embodiment, the target signal defines phase values as a function of time indicative of a kick toward the vehicle, and wherein detecting the moving object comprises detecting the kick toward the vehicle. In an embodiment, the target signal defines phase values as a function of time indicative of a vital sign of a human being, and wherein detecting the moving object comprises detecting the vital sign of the human being. In an embodiment, the target signal comprises phase values as a function of time that characterize the moving object. In an embodiment, the method of detecting the moving object in the channel comprises determining that a correlation between the target signal and the phase signal exceeds a threshold level. In an embodiment, the method of detecting the moving object in the channel comprises providing a velocity of the moving object based on an amplitude of the phase signal. In an embodiment, the method of determining, by the detector, the one or more CIRs comprises correlating one or more pulses of a sequence of pulses of a received frame with an expected one or more pulses, the method further comprising transmitting a plurality of frames over the channel, wherein the Institute of Electrical and Electronics Engineers (IEEE) 802.15.4 standard defines a format and contents of the plurality of transmitted frames.

In another embodiment, a moving object detector is disclosed. The moving object detector comprises: an analog/digital front end implemented with circuitry to receive a plurality of frames from a channel; a CIR estimator implemented with circuitry to determine one or more CIRs of the channel based on the received plurality of frames; a phase extractor implemented with circuitry to determine a CIR phase for each the CIRs and form a phase signal based on a phase value of the CIR phase for each of the CIRs; and an object detector implemented with circuitry to compare the phase signal with a target signal and detect the moving object in the channel based on the comparison. In an embodiment, the phase value of the CIR phase for each of the CIRs that define the phase signal are located in a same time position in each of the CIR phases. In an embodiment, the CIR phase and the phase signal have phase values which vary as a function of time. In an embodiment, the phase extractor to form the phase signal comprises circuitry to form a first candidate phase signal and a second candidate phase signal, wherein the first candidate phase signal is associated with phase values located at only a first time position in each of the CIR phases and the second candidate phase signal is associated with phase values located at only a second time position in each of the CIR phases; and circuitry to select the first or second candidate phase signal as the phase signal based on a respective amplitude or power associated with the first or second candidate phase signal exceeding a threshold level. In an embodiment, the target signal defines phase values as a function of time associated with a kick toward the vehicle, and wherein the object detector to detect the moving object comprises circuitry to detect the kick toward the vehicle. In an embodiment, the target signal defines phase values as a function of time associated with a vital sign of a human being, and wherein the object detector to detect the moving object comprises circuitry to detect the vital sign of the human being. In an embodiment, the target signal comprises phase values as a function of time that characterize the moving object. In an embodiment, the object detector to detect the moving object in the channel comprises circuitry to determine that a correlation between the target signal and the phase signal exceeds a threshold level. In an embodiment, the object detector to detect the moving object in the channel comprises circuitry to provide a velocity of the moving object based on the phase signal. In an embodiment, the detector further comprising a transmitter implemented with circuitry to transmit a plurality of frames over the channel, wherein the Institute of Electrical and Electronics Engineers (IEEE) 802.15.4 standard defines a format and contents of the plurality of transmitted frames.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method to detect a moving object, the method comprising:
    receiving, by a moving object detector, a plurality of frames transmitted over a channel;
    determining, by the detector, one or more channel impulse responses (CIRs) associated with the channel based on the received plurality of frames;
    determining, by the detector, a CIR phase for each of the CIRs;
    forming, by the detector, a phase signal based on a phase value of the CIR phase for each of the CIRs;
    comparing, by the detector, the phase signal with a target signal; and
    detecting, by the detector, the moving object in the channel based on the comparison.

2. The method of claim 1, wherein the phase value of the CIR phase for each of the CIRs that define the phase signal are located in a same time position in each of the CIR phases.

3. The method of claim 1, wherein the CIR phase and the phase signal define phase values that vary as a function of time.

4. The method of claim 1, wherein forming the phase signal comprises forming a first candidate phase signal and a second candidate phase signal, wherein the first candidate phase signal is associated with phase values located at only a first time position in each of the CIR phases and the second candidate phase signal is associated with phase values located at only a second time position in each of the CIR phases; and selecting the first or second candidate phase signal as the phase signal based on a respective amplitude or power associated with the first or second candidate phase signal exceeding a threshold level.

5. The method of claim 1, wherein the target signal defines phase values as a function of time indicative of a kick toward the vehicle, and wherein detecting the moving object comprises detecting the kick toward the vehicle.

6. The method of claim 1, wherein the target signal defines phase values as a function of time indicative of a vital sign of a human being, and wherein detecting the moving object comprises detecting the vital sign of the human being.

7. The method of claim 1, wherein the target signal comprises phase values as a function of time that characterize the moving object.

8. The method of claim 1, wherein detecting the moving object in the channel comprises determining that a correlation between the target signal and the phase signal exceeds a threshold level.

9. The method of claim 1, wherein detecting the moving object in the channel comprises providing a velocity of the moving object based on an amplitude of the phase signal.

10. The method of claim 1, wherein determining, by the detector, the one or more CIRs comprises correlating one or more pulses of a sequence of pulses of a received frame with an expected one or more pulses, the method further comprising transmitting a plurality of frames over the channel, wherein the Institute of Electrical and Electronics Engineers (IEEE) 802.15.4 standard defines a format and contents of the plurality of transmitted frames.

11. A moving object detector comprising:
    an analog/digital front end implemented with circuitry to receive a plurality of frames from a channel;
    a CIR estimator implemented with circuitry to determine one or more CIRs of the channel based on the received plurality of frames;
    a phase extractor implemented with circuitry to determine a CIR phase for each the CIRs and form a phase signal based on a phase value of the CIR phase for each of the CIRs; and
    an object detector implemented with circuitry to compare the phase signal with a target signal and detect the moving object in the channel based on the comparison.

12. The detector of claim 11, wherein the phase value of the CIR phase for each of the CIRs that define the phase signal are located in a same time position in each of the CIR phases.

13. The detector of claim 11, wherein the CIR phase and the phase signal have phase values which vary as a function of time.

14. The detector of claim 11, wherein the phase extractor to form the phase signal comprises circuitry to form a first candidate phase signal and a second candidate phase signal, wherein the first candidate phase signal is associated with phase values located at only a first time position in each of the CIR phases and the second candidate phase signal is associated with phase values located at only a second time position in each of the CIR phases; and circuitry to select the first or second candidate phase signal as the phase signal based on a respective amplitude or power associated with the first or second candidate phase signal exceeding a threshold level.

15. The detector of claim 11, wherein the target signal defines phase values as a function of time associated with a kick toward the vehicle, and wherein the object detector to detect the moving object comprises circuitry to detect the kick toward the vehicle.

16. The detector of claim 11, wherein the target signal defines phase values as a function of time associated with a vital sign of a human being, and wherein the object detector to detect the moving object comprises circuitry to detect the vital sign of the human being.

17. The detector of claim 11, wherein the target signal comprises phase values as a function of time that characterize the moving object.

18. The detector of claim 11, wherein the object detector to detect the moving object in the channel comprises circuitry to determine that a correlation between the target signal and the phase signal exceeds a threshold level.

19. The detector of claim 11, wherein the object detector to detect the moving object in the channel comprises circuitry to provide a velocity of the moving object based on the phase signal.

20. The detector of claim 11, further comprising a transmitter implemented with circuitry to transmit a plurality of frames over the channel, wherein the Institute of Electrical and Electronics Engineers (IEEE) 802.15.4 standard defines a format and contents of the plurality of transmitted frames.

* * * * *